United States Patent
Ohliger et al.

(10) Patent No.: US 6,451,241 B1
(45) Date of Patent: Sep. 17, 2002

(54) METHOD FOR FABRICATION OF PERFORATED COMPOSITE

(75) Inventors: Alla Ohliger, Hunt Valley; Mahendra Maheshwari, Forrest Hill; Joe Franklin Spangler, Westminster, all of MD (US)

(73) Assignee: MRA Systems, Inc., Bethesda, MD (US)

( * ) Notice: Subject to any disclaimer, the term of this patent is extended or adjusted under 35 U.S.C. 154(b) by 908 days.

(21) Appl. No.: 08/627,213

(22) Filed: Feb. 1, 1996

(51) Int. Cl.[7] .............................. B28B 1/48; B29C 70/44
(52) U.S. Cl. ................. 264/510; 264/511; 264/156; 264/313; 264/316
(58) Field of Search ................................ 264/154, 155, 264/156, 510, 511, 313, 316

(56) References Cited

U.S. PATENT DOCUMENTS

| | | | | |
|---|---|---|---|---|
| 2,978,376 A | * | 4/1961 | Hulse ........................ | 264/510 |
| 3,607,600 A | * | 9/1971 | Schreter et al. ............. | 264/213 |
| 3,704,194 A | * | 11/1972 | Harrier ...................... | 156/245 |
| 3,787,546 A | * | 1/1974 | Pratt et al. ................. | 264/510 |
| 4,131,664 A | * | 12/1978 | Flowers et al. ............. | 264/510 |
| 4,696,711 A | * | 9/1987 | Greszczuk ................... | 156/173 |
| 4,942,012 A | * | 7/1990 | Lee et al. ................... | 264/510 |
| 5,242,652 A | * | 9/1993 | Savigny ...................... | 264/510 |

* cited by examiner

Primary Examiner—Jan H. Silbaugh
Assistant Examiner—Stefan Staicovici
(74) Attorney, Agent, or Firm—David L. Narciso

(57) ABSTRACT

A sheet of uncured polymer, which is preferably reinforced with multiple layers of fiber, is staged or partially cured to a state in which the sheet is rigid at room temperature. Multiple apertures are drilled into, and preferably through, the sheet. The apertures are for acoustic or laminar flow control, and include holes having diameters in the range of 0.025 to 0.120 inch. In the case in which the fabricated panels must conform to a particular shape, the perforated, partially cured panels are heated to a temperature at which the panel softens, and conformed to the desired surface. The partially cured, perforated sheets are then cured. In order to prevent closure of the drilled holes during the cure, the perforated panel is sandwiched between two layers of glass fabric and cured on an elastomeric tool surface which expands with increases in temperature, forcing the glass fabric to seal the holes during cure. Release coatings are used to aid panel/liner separation.

14 Claims, 5 Drawing Sheets

METHOD FOR FABRICATION OF PERFORATED COMPOSITE

FIELD OF THE INVENTION

This invention relates to methods for fabrication of perforated composite panels, and particularly such panels which are conformed to curved surfaces.

BACKGROUND OF THE INVENTION

Perforated panels are used in various applications for sound suppression or laminar flow control. Acoustic noise control or sound suppression may be accomplished by acoustic labyrinths, in which the energy of an unwanted sound wave is dissipated. One easily fabricated form of such labyrinths is a plurality of closed-end apertures in a surface facing the acoustic source. Laminar flow control may be accomplished by porous or perforated surfaces through which turbulent air adjacent the surface is vacuumed, to leave laminar flow at the surface. When such perforated panels are used in vehicles, they must conform to the shape of the vehicle, which, in most cases, includes surfaces which are curved in two or in three dimensions. Vehicular use has the further requirement of low weight, so perforated panels are ordinarily made from fiber reinforced laminated polymer composites.

Perforated panels of fiber reinforced laminated polymer with apertures can be fabricated with the aid of a studded mold or pin mandrel. Resin impregnated fabric is pressed over the studded tool and cured to create the perforations. The curing often requires high temperatures, so the tool must have a high temperature capability. A mold release agent must be applied over the mandrel to aid in release of the mold from the cured composite without damaging the composite. Cleaning of the mold release agent from the perforated panel is labor intensive and costly. When the cured panel is contoured or curved, it may be necessary to use a mandrel with rubber or elastomeric studs or pins, to allow them to be removed from the cured panel.

Improved methods are desired for fabrication of perforated fiber reinforced laminated polymer panels or sheets.

SUMMARY OF THE INVENTION

A sheet of uncured polymer, which is preferably reinforced with multiple layers of fiber, is staged or partially cured to a state in which the sheet is rigid at room temperature. Multiple apertures are drilled into, and preferably through, the sheet. The apertures are for acoustic or laminar flow control, and include holes having diameters in the range of 0.025 to 0.120 inch, although diameters outside these ranges are possible. In the case in which the fabricated panels must conform to a particular shape, the perforated, partially cured panels are heated to a temperature at which the panel softens, and in the softened state are formed in order to conform to the desired surface. The partially cured, perforated sheets are then cured. In order to prevent hole closure (or other major distortion of the drilled holes) during the cure, at least one surface of the sheet is held against an elastomeric tool surface, where the elastomer expands with temperature, and a mold release layer in the form of a fibrous material lying between the tool surface and the sheet allows the cured sheet to be released from the tool surface. In a preferred embodiment of the invention, the perforated, partially cured sheet is sandwiched between layers of glass fabric during cure on the elastomeric tool surface.

In a preferred embodiment of the method, the polymer is of epoxy or bismaleimide material, and the reinforcement is graphite fiber. The elastomeric tool surface on which the panel is cured is of a fluoroelastomer rubber material laminated with fiber reinforcement for dimensional stability, and with a release coating of tetrafluoroethylene surface film on one side to aid part/liner separation. Part/liner separation is further aided by a glass fabric placed between the sheet being cured and the elastomeric tool surface.

DESCRIPTION OF THE INVENTION

Figure 1:
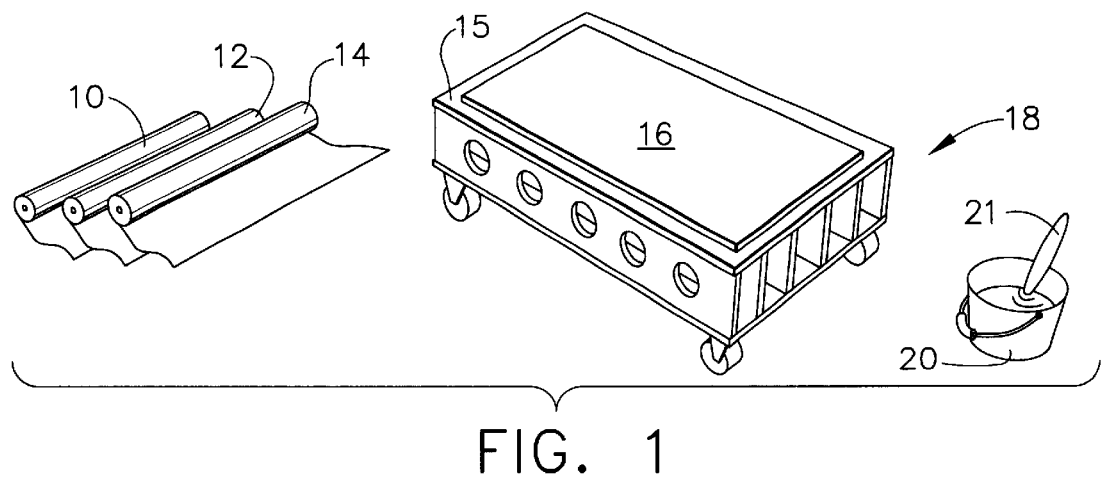
FIG. 1 is a representation of the step of laying up a sheet consisting of multiple layers of uncured resin-impregnated fabric.
Figure 2:
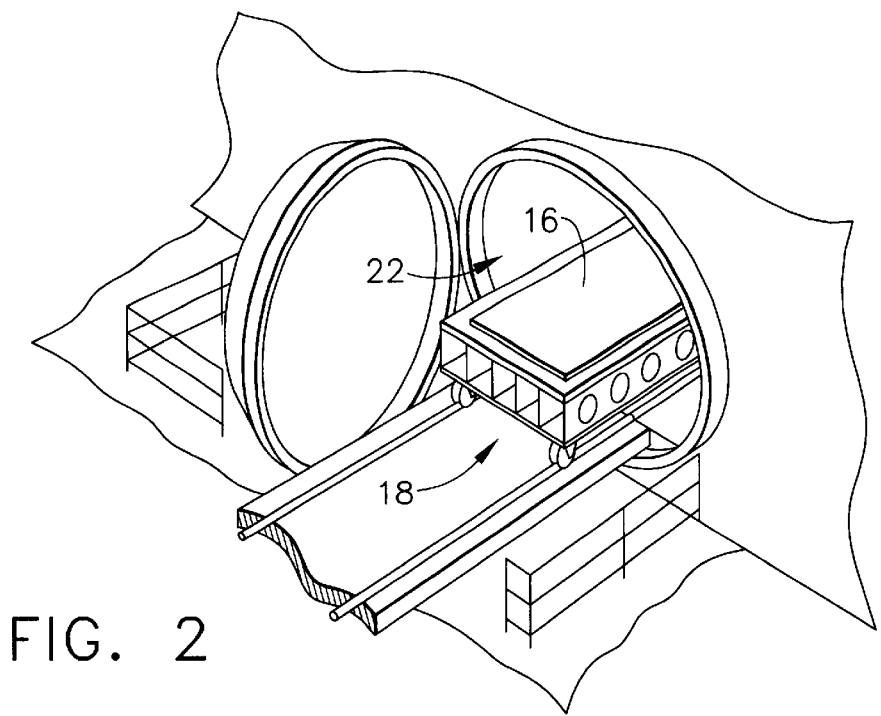
FIG. 2 represents placing the uncured sheet of FIG. 1 in an autoclave for staging or partial curing.

In FIG. 1, a plurality of rolls 10, 12, and 14 of uncured resin-impregnated graphite fiber reinforcement material (prepreg) represent the initiation of the fabrication of uncured fiber-reinforced polymer sheet. The preimpregnated reinforcing fabric is laid up on the flat surface 15 of a wheeled tool 18. If the rolls 10, 12, and 14 are not preimpregnated with resin, they may be laid up one at a time and impregnated with liquid polymer resin, as suggested by pot 20 and brush 21 of FIG. 1. The polymer may be epoxy, bismaleimide, or other polymer. The reinforcing fiber may be woven or matted fiber, in the form of plane or unidirectional weave, 8-harness satin, or other reinforcement. The resulting uncured multilayer sheet 16 is then vacuum bagged, and placed, together with the wheeled tool 18, in an autoclave 22, as suggested by FIG. 2. The temperature and duration of the treatment in the autoclave are selected to partially cure the polymer to a physical state in which it the sheet may be handled as an essentially rigid sheet at room temperature. In this context, the term "essentially rigid" means that the sheet, when at or below room temperature, is approximately as rigid as a cured sheet of the same dimensions and thickness. When in this state, the sheet is not tacky and is easily handled at room temperature, but it loses its rigidity, and becomes plastic or pliable, at an elevated temperature in the vicinity of 160° to 180°. The amount (time and temperature) of partial cure to the first stage of cure will depend upon the nature of the resin, and its rheology must be evaluated beforehand.

Figure 3:
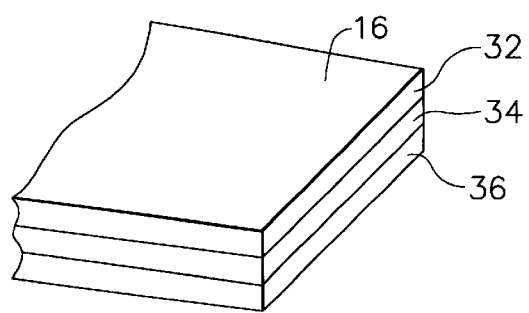
FIG. 3 illustrates a portion of the partially cured reinforced polymer sheet produced by the step of FIG. 2.

FIG. 3 is a perspective or isometric view of a portion of the partially cured sheet 16, illustrating reinforcing layers or plies 32, 34, and 36. Once the sheet is partially cured, it should be kept cold by maintenance in a refrigerator or freezer to prevent further cure, being removed from the refrigeration only for performance of further processing steps.

Figure 4:
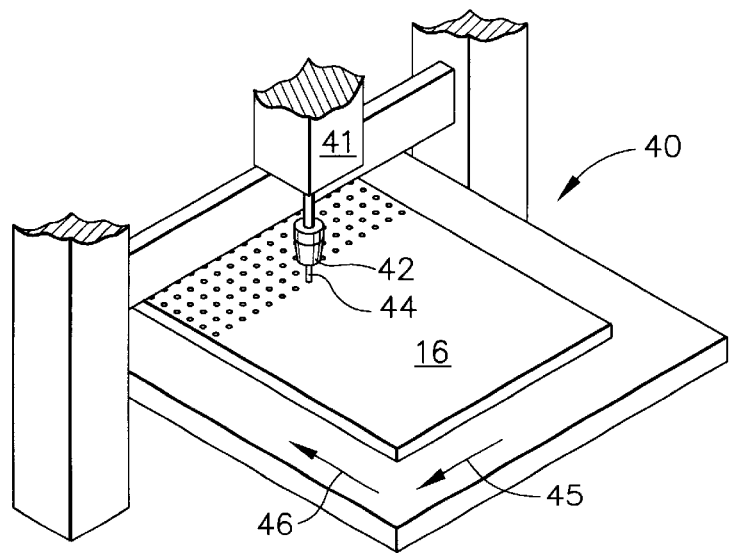
FIG. 4 illustrates drilling multiple holes in the partially cured polymer sheet of FIG. 3.

FIG. 4 illustrates a portion 40 of a single-spindle or single-head drill press, with a single head 41 carrying a rotary chuck 42, which in turn carries a drill bit 44. The workpiece is the partially cured sheet 16. The head of the drill press is programmed to rise and fall or reciprocate in a vertical direction, while rotating the drill bit. This results in drilling a hole having a diameter equal to the bit diameter to the depth of the head motion. If the head motion exceeds the thickness of the workpiece, the drilled aperture extends entirely through the workpiece. Each reciprocation of the drill press head is accompanied by an indexed movement of the workpiece in one of the directions indicated by arrows 45 and 46, together with indexed movement in the other one of the directions indicated by arrows 45 and 46 after a predetermined number of reciprocations of the drill press head, so that the drilled apertures are separated by the index distance, to form rows and columns of drilled apertures. Naturally, the drill press head may be arranged for indexed motion instead. While a single-head drill press is illustrated and described, a multiple-head drill press is preferred, in order to drill multiple holes at each reciprocation. To prevent material delamination during the drilling operation, the partially cured sheet may be sandwiched between two phenolic boards (not illustrated). Several partially cured sheets may be drilled simultaneously, if desired.

Figure 5:
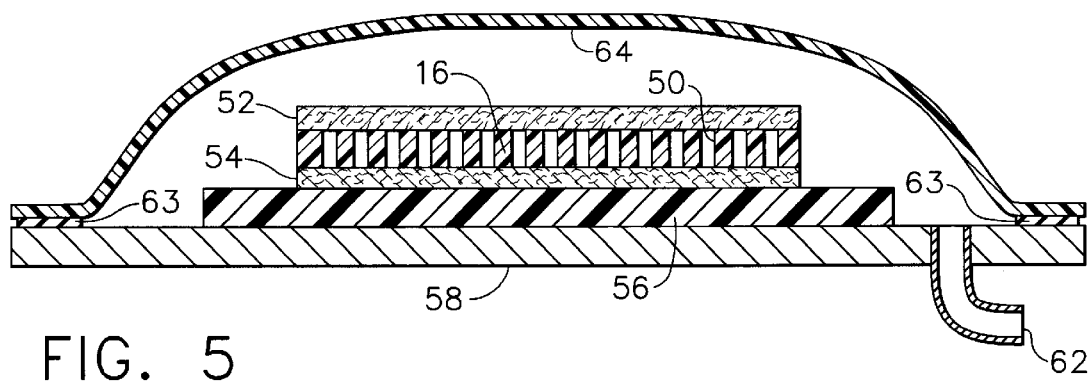
FIG. 5 is a cross-sectional view of the perforated partially cured reinforced polymer of FIG. 4, sandwiched by release sheets, laid on an elastomer surface of a tool, and bagged, representing the step of full curing of the perforated reinforced polymer sheet.

FIG. 5 is a cross-section of a portion of the drilled, partially cured sheet 16 resulting from the operation described in conjunction with FIG. 4, with some of the drilled holes designated as 50. As mentioned above, the partially cured sheet 16 is essentially rigid. The partially cured sheet 16 is layered with layers 52 and 54 of porous TEFLON-coated glass fabric, type TM7025, which is manufactured by Taconic Plastics Limited, the address of which is 3070 Skyway Drive, building 502, Santa Maria, Calif. 93455, phone (800) 832-0982, for drilled hole diameters of 0.104 inch. The glass fabric layers 52 and 54 are essentially mold release materials. The partially cured, perforated sheet 16, with its glass fabric release sheets 52 and 54, is placed against an elastomer liner or coating 56 over a rigid tool surface 58, which in this case is flat. The elastomeric tool liner 56 is fabricated using uncured sheets of fluoroelastomer, such as unreinforced sheet TX-4400, fabric reinforced sheet TX-4401, or TX-4402 sheet laminated with tetrafluoroethylene release film, all of which are manufactured by 3M, the address of which is 3211 East Chestnut Expressway, Springfield, Mo. 65802. The liner 56 is conformed to the tool surface (flat in the case of the tool 58 of FIG. 5), and then cured. The cured elastomeric liner 56 may be bonded to the tool surface 58, or it may be attached temporarily during use. In applications where dimensional stability of the liner is not critical, unreinforced sheet with tetrafluoroethylene release film may be used. Additional sheets of unreinforced fluoroelastomer may be used to increase the thickness of the cured liner.

Tool surface 58 of FIG. 5, partially cured perforated sheet 16, and glass fabric release sheets 52 and 54 are bagged in a bag 64. In this context, "bag" 64 is a sheet which overlies the tool surface 58, and is sealed thereto by an edge sealant 63 in conjunction with a vacuum applied to a vacuum port 62. The vacuum allows atmospheric pressure to press on the bag 64 and on the partially cured perforated sheet 16, to hold the partially cured perforated sheet against the elastomeric tool surface 58. The entirety of the tool 58 with elastomer lining 56, bag 64, partially cured perforated sheet 16, and glass sheets 52 and 54, are placed in an autoclave for complete curing.

During the complete cure, the elastomeric liner material 56 expands and partially fills the drilled apertures. In addition, the glass fabric 52, 54 is pressed into the cavities of the drilled apertures, and completely seals the perforations. Since the material of sheet was already staged or partially cured before the final cure, only minor resin flow occurs during the final cure. This minor flow of the resin has the additional advantage that the ends of the graphite (or other) reinforcing fibers, which might be exposed during the drilling step, are covered over or encapsulated by the resin. This advantage may be of significance if the reinforcement fibers are subject to corrosion or chemical reaction with the environment. The diameters of the drilled apertures in the perforated panel may be slightly smaller after full cure than the original drilled diameter, but they will retain a generally cylindrical shape.

Figure 6:
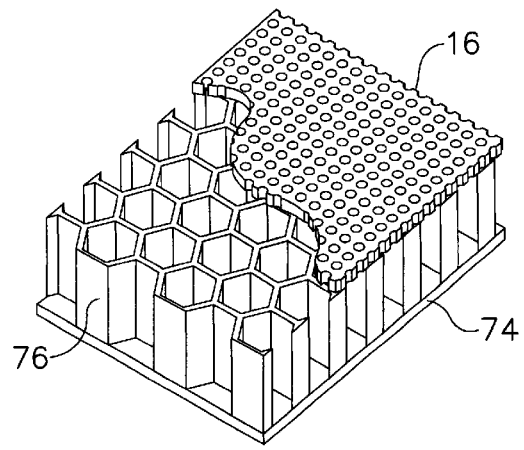
FIG. 6 illustrates the cured, perforated sheet of FIG. 5 affixed to a structural support member to form a honeycomb panel.

After the cure represented by FIG. 5, the cured, perforated sheet is removed from the bag, and separated from the glass fabric. Cured, perforated sheet 16 may be used as-is, or it may be laminated to a form a honeycomb structural member, as illustrated in FIG. 6. In FIG. 6, a honeycomb core 76 is bonded on one side to solid metallic or composite sheet 74, and on the other side to the cured perforated composite panel 16.

Figure 7:
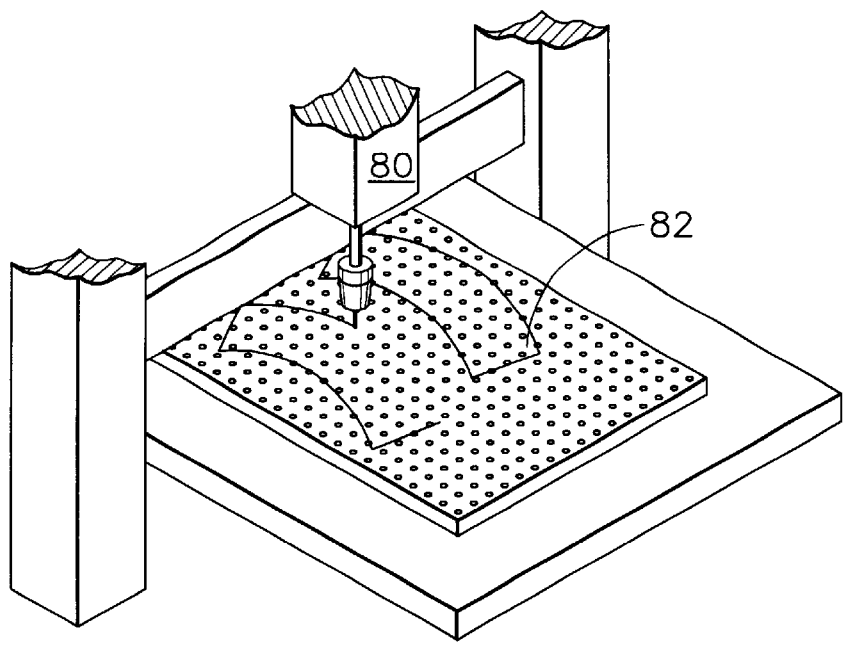
FIG. 7 represents a cutting step following the step of FIG. 4 when the final cured article is three-dimensional.
Figure 12:
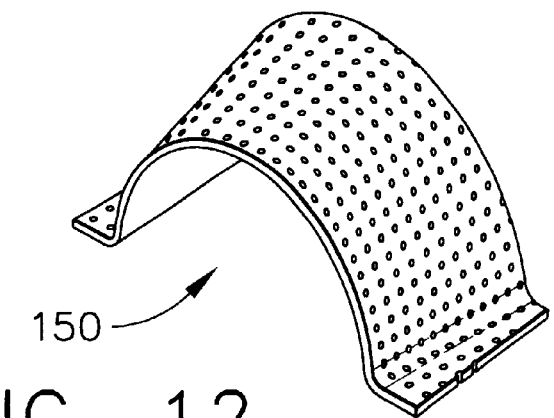
FIG. 12 illustrates the completed three-dimensional, perforated, reinforced, cured composite article.

It may be desirable to use the inventive technique to make a perforated panel having a three-dimensional shape, such as a portion of a cone. FIG. 12 illustrates a completed cured perforated panel 150 in the form of a portion of a cone, with flanges. The panel of FIG. 12 may be made by performing the steps represented by FIGS. 1 through 4, to form perforated, partially cured flat panels. FIG. 7 represents the optional next step in producing the three-dimensional shaped panel 150, which is to cut appropriate shapes from the flat sheets, using a router 80 with a numerically controlled bed, or some other cutting tool. The result is shaped, uncured, perforated flat sheets 82 having a particular outline. If the cutting step is omitted at this stage, the edges of the material may protrude from the tool in subsequent steps, but this may be of no consequence.

Figure 8:
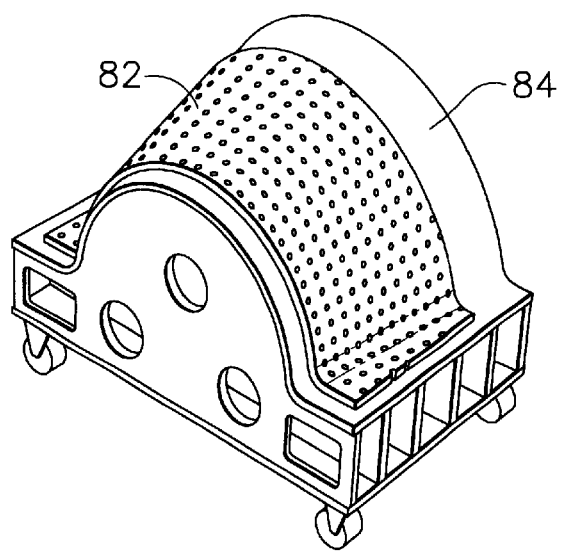
FIG. 8 represents the heating and conforming of the partially cured, perforated sheet to a three-dimensional tool surface.

FIG. 8 represents heating of the shaped, partially cured, perforated flat sheets 82 to a temperature at which they become pliable, and fitting or conforming the plastic sheets to a tool surface 84 which is the same as the desired final shape. This results in partially cured, perforated, and conformed articles, which are no longer explicitly "sheets," except in that they are of uniformly thin material, and which are rigid at and below room temperature.

Figure 9:
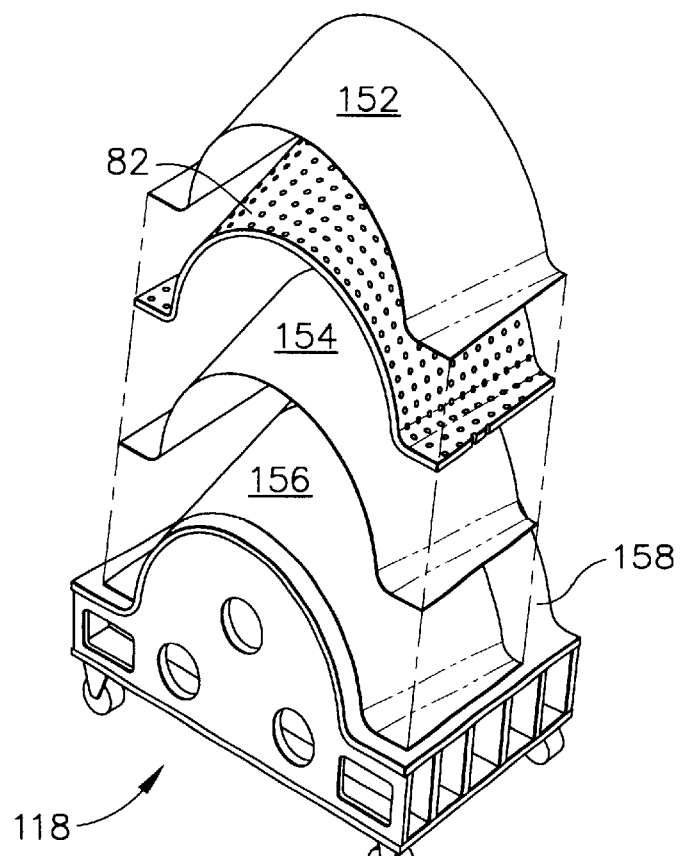
FIGS. 9 and 10 represent three-dimensional equivalents of the step of FIG. 5.
Figure 10:
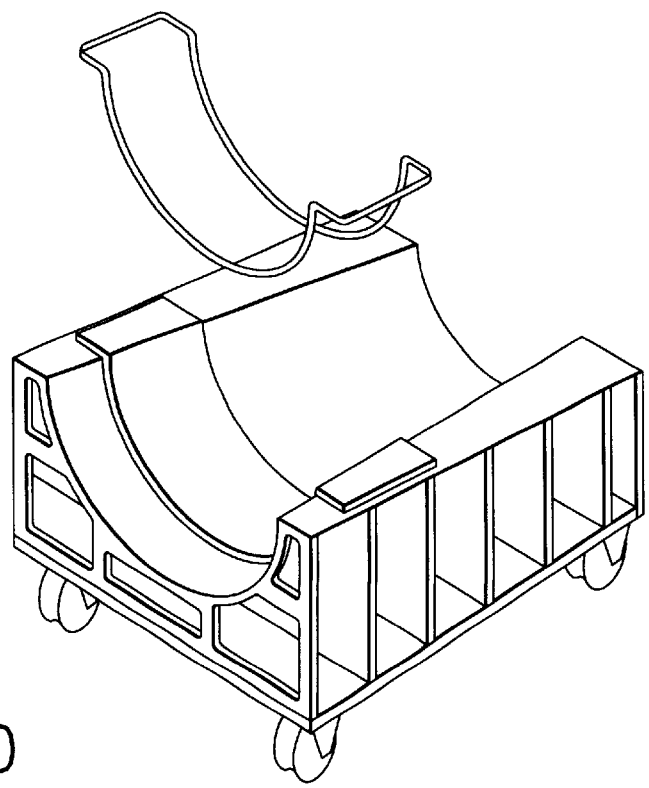

Following the conforming step represented by FIG. 8, the curing process is generally similar to that previously described for flat sheets, but adjusted to the three-dimensional structure of the articles. The elastomeric liner 156 and the partially cured, conformed article 82 with the glass fabric release sheets 152, 154 are bagged to the convex surface of the tool 158 as illustrated in FIG. 9, or concave surface as illustrated in FIG. 10. The tool used during the conforming step described in conjunction with FIG. 8 has the same curvature as the tool used in FIG. 9, and may be the same. The tool of FIG. 9 or 10 is bagged, together with the partially conformed, perforated article sandwiched between glass fabric sheets, all as described previously.

Figure 11:
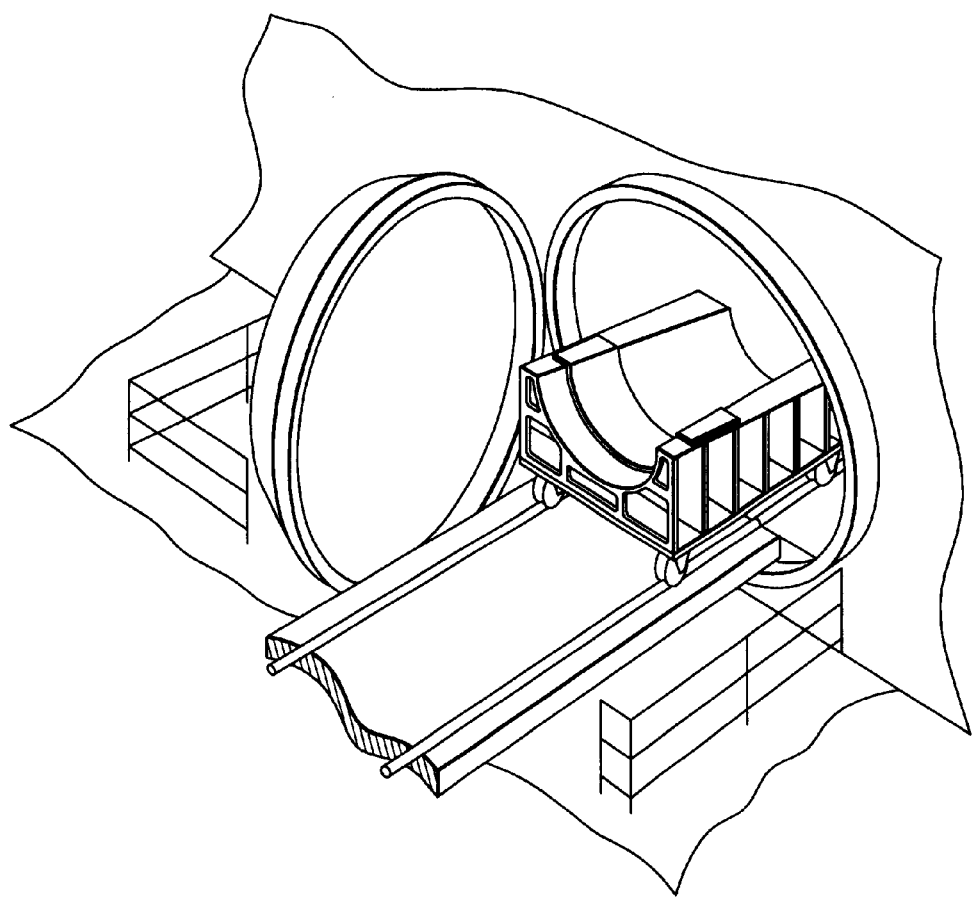
FIG. 11 represents the autoclaving of the three-dimensional article to a completely cured state.

FIG. 11 represents the placing of the bagged arrangement of either FIG. 9 or 10 in an autoclave to completely cure the partially cured, perforated, conformed and bagged article, and FIG. 12 represents the completed article.

It has been found that, when the drilled apertures are about 0.025 inch in diameter, the glass release fabric is preferably TM 7075, manufactured by Taconic Plastics Limited.

Other embodiments of the invention will be apparent to those skilled in the art. For example, while drilled apertures have been described, other methods for making apertures may be used, as for example punch drilling or laser drilling. Different drilled hole diameters may be used on a single article, if desired, and the holes may be distributed over the surface of the composite material in any desired pattern. While flat and concave tool surfaces have been illustrated and described, convex tool surfaces may also be used, or tool surfaces with compound curvatures.

What is claimed is:

1. A method for fabricating polymer panels with apertures, comprising the steps of:
   providing a flat polymer panel, partially cured to a state in which the panel can be handled as a rigid sheet at room temperature;
   drilling a plurality of apertures into said partially cured panel to produce a partially cured perforated sheet;
   juxtaposing a surface of said partially cured perforated sheet with an elastomeric tool surface having a shape conforming to a desired final shape of said panel;
   while said perforated sheet is juxtaposed with said elastomeric tool surface, heating said perforated sheet sufficiently to completely cure said perforated sheet; and
   removing said cured perforated sheet from said tool surface.

2. The method according to claim 1, further comprising the step, before said heating step, of providing a mold release material between said elastomeric tool surface and said partially cured perforated sheet.

3. The method according to claim 2, wherein said step of providing a mold release material includes the step of providing a layer of fabric between said elastomeric tool surface and said partially cured perforated sheet.

4. The method according to claim 3, wherein said step of providing a layer of fabric comprises the step of providing a layer of glass fabric.

5. The method according to claim 1, wherein said step of juxtaposing a surface of said partially cured perforated sheet with an elastomeric tool surface having a shape conforming to the desired final shape of said panel comprises the further step of heating said partially cured perforated sheet to a temperature at which said partially cured perforated sheet becomes pliable.

6. The method according to claim 1, wherein said step of drilling a plurality of apertures into said partially cured panel comprises the step of rotating a drill bit while repeatedly advancing said drill bit through at least a portion of said panel.

7. The method according to claim 6, wherein said step of repeatedly advancing said drill bit is accompanied by the step, between each said advancement of said drill bit, of moving said partially cured panel relative to said drill bit.

8. The method according to claim 1, further including, before said step of juxtaposing, the step of placing said partially cured perforated sheet in a bag.

9. The method according to claim 8, including, in conjunction with said step of heating said partially cured perforated sheet sufficiently to completely cure said partially cured perforated sheet, the further step of evacuating said bag.

10. The method according to claim 1, wherein said step of providing a flat polymer panel includes the step of providing a flat uncured reinforced polymer panel; and
    partially curing said flat uncured reinforced polymer panel to said state in which said partially cured panel can be handled as a rigid sheet at room temperatures.

11. A method for producing a perforated acoustic article, comprising the steps of:
    providing an uncured sheet of polymer material;
    partially curing said uncured sheet to a form in which it can be handled as a rigid sheet at room temperature, to thereby form a partially cured sheet
    drilling a plurality of apertures in said partially cured sheet to form a partially cured perforated sheet;
    preheating said partially cured perforated sheet to make it flexible;
    following said preheating step, conforming said partially cured perforated sheet to a tool surface, to thereby generate a conformed partially cured perforated article;
    following said conforming step, juxtaposing a surface of said conformed partially cured perforated article with an elastomeric surface of a tool, with a mold release material lying between said surface of said article and said elastomeric surface;
    providing a vacuum about said conformed partially cured perforated article, and heating said conformed partially cured perforated article to generate a cured perforated article.

12. The method according to claim 11, wherein said step of providing a vacuum includes the step of placing said conformed partially cured perforated article in a bag, and evacuating said bag.

13. The method according to claim 11, wherein said step of providing an uncured sheet of polymer material includes the step of providing an uncured sheet of multilayer fiber-reinforced polymer-impregnated material.

14. The method according to claim 11, wherein said step of providing a vacuum about said conformed partially cured perforated article includes the steps of:
    placing said conformed partially cured perforated article in a bag:
    placing a mold release material between a surface of said article and said bag; and
    evacuating said bag.

* * * * *